United States Patent
Borkowski et al.

(10) Patent No.: US 9,697,059 B2
(45) Date of Patent: Jul. 4, 2017

(54) VIRTUALIZED COMMUNICATION SOCKETS FOR MULTI-FLOW ACCESS TO MESSAGE CHANNEL INFRASTRUCTURE WITHIN CPU

(71) Applicant: Intel Corporation, Santa Clara, CA (US)

(72) Inventors: Daniel G. Borkowski, Lunenburg, MA (US); Krishnakanth V. Sistla, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 43 days.

(21) Appl. No.: 14/722,049

(22) Filed: May 26, 2015

(65) Prior Publication Data
US 2015/0254118 A1  Sep. 10, 2015

Related U.S. Application Data

(63) Continuation of application No. 13/648,139, filed on Oct. 9, 2012, now Pat. No. 9,092,581.

(51) Int. Cl.
G06F 13/40     (2006.01)
G06F 9/54      (2006.01)

(52) U.S. Cl.
CPC ............. *G06F 9/546* (2013.01); *G06F 9/544* (2013.01); *G06F 9/545* (2013.01); *G06F 13/4059* (2013.01)

(58) Field of Classification Search
None
See application file for complete search history.

(56) References Cited

U.S. PATENT DOCUMENTS

| | | | |
|---|---|---|---|
| 6,055,618 A | 4/2000 | Thorson | |
| 2002/0032655 A1* | 3/2002 | Antonin | G06Q 20/1085 705/43 |
| 2002/0069248 A1* | 6/2002 | King | G06Q 10/10 709/204 |
| 2003/0056020 A1 | 3/2003 | Chaudhry | |

(Continued)

FOREIGN PATENT DOCUMENTS

WO  2011053891  5/2011

OTHER PUBLICATIONS

International Preliminry Report on Patentability for PCT Application No. PCT/US2013/063647, mailed on Apr. 23, 2015, 8 pages.

*Primary Examiner* — Tuan Dao
(74) *Attorney, Agent, or Firm* — Carrie A Boone PC

(57) ABSTRACT

A message channel optimization method and system enables multi-flow access to the message channel infrastructure within a CPU of a processor-based system. A user (pcode) employs a virtual channel to submit message channel transactions, with the message channel driver processing the transaction "behind the scenes". The message channel driver thus allows the user to continue processing without having to block other transactions from being processed. Each transaction will be processed, either immediately or at some future time, by the message channel driver. The message channel optimization method and system are useful for tasks involving message channel transactions as well as non-message channel transactions.

10 Claims, 7 Drawing Sheets

(56) References Cited

U.S. PATENT DOCUMENTS

| | | | |
|---|---|---|---|
| 2004/0098141 A1* | 5/2004 | Martin | G05B 19/056 700/18 |
| 2006/0136923 A1* | 6/2006 | Kahn | G06F 9/468 718/100 |
| 2007/0053350 A1 | 3/2007 | Spink | |
| 2007/0282951 A1* | 12/2007 | Selimis | H04L 67/06 709/205 |
| 2009/0037665 A1* | 2/2009 | Tsien | G06F 12/0831 711/141 |
| 2010/0017513 A1 | 1/2010 | Abts | |

* cited by examiner

VIRTUALIZED COMMUNICATION SOCKETS FOR MULTI-FLOW ACCESS TO MESSAGE CHANNEL INFRASTRUCTURE WITHIN CPU

CROSS-REFERENCE TO RELATED APPLICATION

This application is a continuation of U.S. Pat. No. 9,092,581, issued on Jul. 28, 2015.

TECHNICAL FIELD

This application relates to multiprocessor systems, portable machine code, and message channel transaction processing.

BACKGROUND

FIG. 1 is a simplified block diagram of a multiprocessor system 500, according to some embodiments. The multiprocessor system 500 includes N central processing units (CPUs) 150A, 150B, . . . , 150N (collectively, "CPUs 150"), which are coupled to N–1 specialized busses, known as quick path interconnect (QPI) busses 160A, 160B, . . . , 160N–1 (collectively, "QPI busses 160"). The QPI busses 160, specifically designed for the CPUs, speed up communication between the CPUs 150. The CPUs may also be coupled to one or more volatile memories (not shown).

Also featured in the multiprocessor system 500 are up to N peripheral controller hubs (PCHs) 180A, . . . , 180N (collectively, "PCHs 180") coupled to the CPUs 150 via up to N specialized busses, known as direct media interface (DMI) busses 170A, 170B, . . . , 170N. The PCHs 180 interface between the CPUs 150 and one or more peripheral devices of the multiprocessor system 500. The PCHs 180 may include display, input/output (I/O) control, a real-time clock, and other functions and may connect to an integrated display as well as other peripheral devices, such as a keyboard, a mouse, a non-volatile storage device, and so on.

For communication between endpoints within the processor of a multiprocessor system 500 or a single processor-based system, a message channel is used. The message channel is the transmission medium for these communications, and may be thought of as a type of "tunnel" or "subway" between endpoints inside the processor. There may be many message channel endpoints, and a message may be sent from any endpoint to any other endpoint, with the endpoints being functional entities within the processor. Portable machine code, or pcode, is used to communicate between the entities, and the pcode has its own endpoint for sending messages to other endpoints. (No endpoint sends an autonomous message to the pcode, as the only message that is received by the pcode endpoint is a response to a message that the pcode originated.) Power management request (PM-Req) messages go to other entities using the QPI bus, which is similar to the message channel, except that the QPI bus is an external bus/interface. The message channel, by contrast, is strictly internal to the processor.

In CPU-based systems, such as a single-processor system or the multiprocessor system 500 of FIG. 1, a message channel is used by many disparate pcode flows and functions. These functions may be used to read and write uncore control registers, issue PMReqs, and send messages to other platform entities (e.g., other CPUs 150, PCHs 180). The pcode uses the message channel quite frequently, from hundreds of times per millisecond to thousands of times per millisecond.

Some newer multiprocessor systems are designed in such a way that the message channel may become blocked at various times, such as during a frequency transition. Previous multiprocessor systems did not have this issue, as their message channel interfaces were always fully functional. So, the pcode in previous projects could use the message channel in a "blocking" manner by sending the transaction onto the message channel, and waiting in a tight loop for the completion of the transaction.

For newer multiprocessor systems, the use of "blocking" transactions on the message channel is deemed unacceptable because the blocking transaction can potentially lock up pcode for several tens of microseconds. The blocking transactions thus lead to a higher latency for other (non-message-channel-related) functions and impact the performance of the CPU. In addition, there is a risk of a deadlock because the message channel is blocked by some function that is waiting for something from the pcode via a sideband interface, but the pcode is blocked waiting for a message channel transaction to complete.

Additionally, PMreq messages require arbitration for use of a single buffer in a PMReq engine (PME). PMreq messages go over the message channel to the PME, and then over the QPI bus 160 to another CPU 150 (or over the DMI bus 170 to the PCH 180). As part of the PMreq protocol correctness, the PME will wait for a completion (CMP) from the other CPU/PCH, and will keep the PMReq buffer locked until the completion is actually received. In this case, if a blocking message channel transaction is used, the pcode will be locked up for the entire round-trip duration of the PMreq/CMP exchange. There may be delays on the other CPU (due to a frequency change, etc.), which further prolongs the duration of the lock-up.

Thus, there is a continuing need for a solution that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a virtual message channel and driver are disclosed for enabling multi-flow access to the message channel infrastructure within a CPU of a processor-based system. Each pcode flow that uses the message channel is assigned a virtual channel identifier. Each flow with a virtual channel identifier can register a callback address and can submit one message channel transaction for processing. The transaction will be processed, either immediately or at some future time, by a message channel driver.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 2:
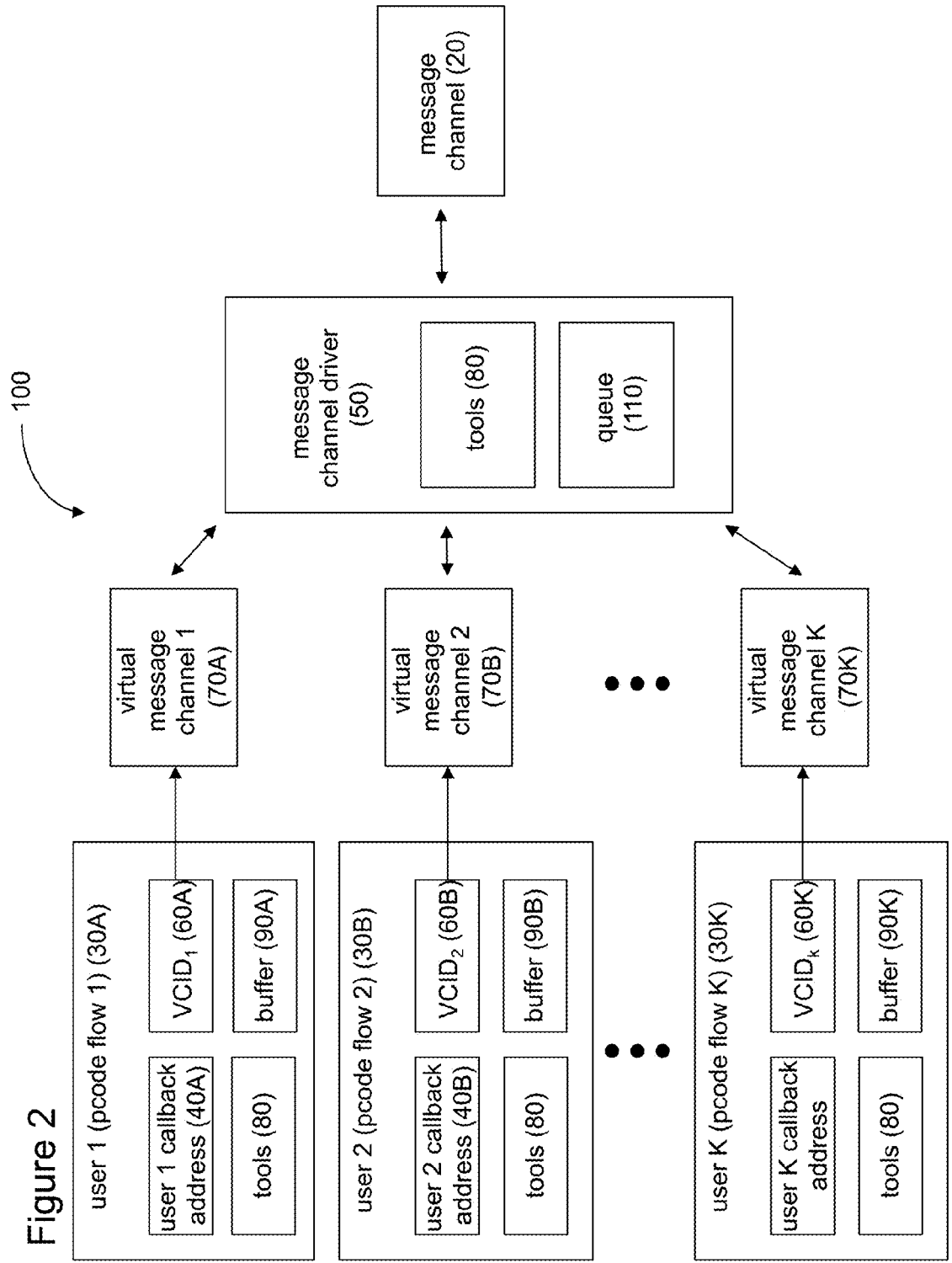
FIG. 2 is a simplified block diagram of the message channel optimization method and system, according to some embodiments.

FIG. 2 is a simplified block diagram of a message channel optimization method 100, or optimization method 100, according to some embodiments. The optimization method 100 employs virtualized communication sockets for enabling multi-flow access to the message channel infrastructure of a processor-based system. The optimization method 100 uses a message channel driver 50 to interface between virtual channels 70A, 70B, . . . , 70K (collectively, "virtual channels 70") and a physical message channel 20 that is used for communication between endpoints within a processor of the processor-based system.

Figure 1:
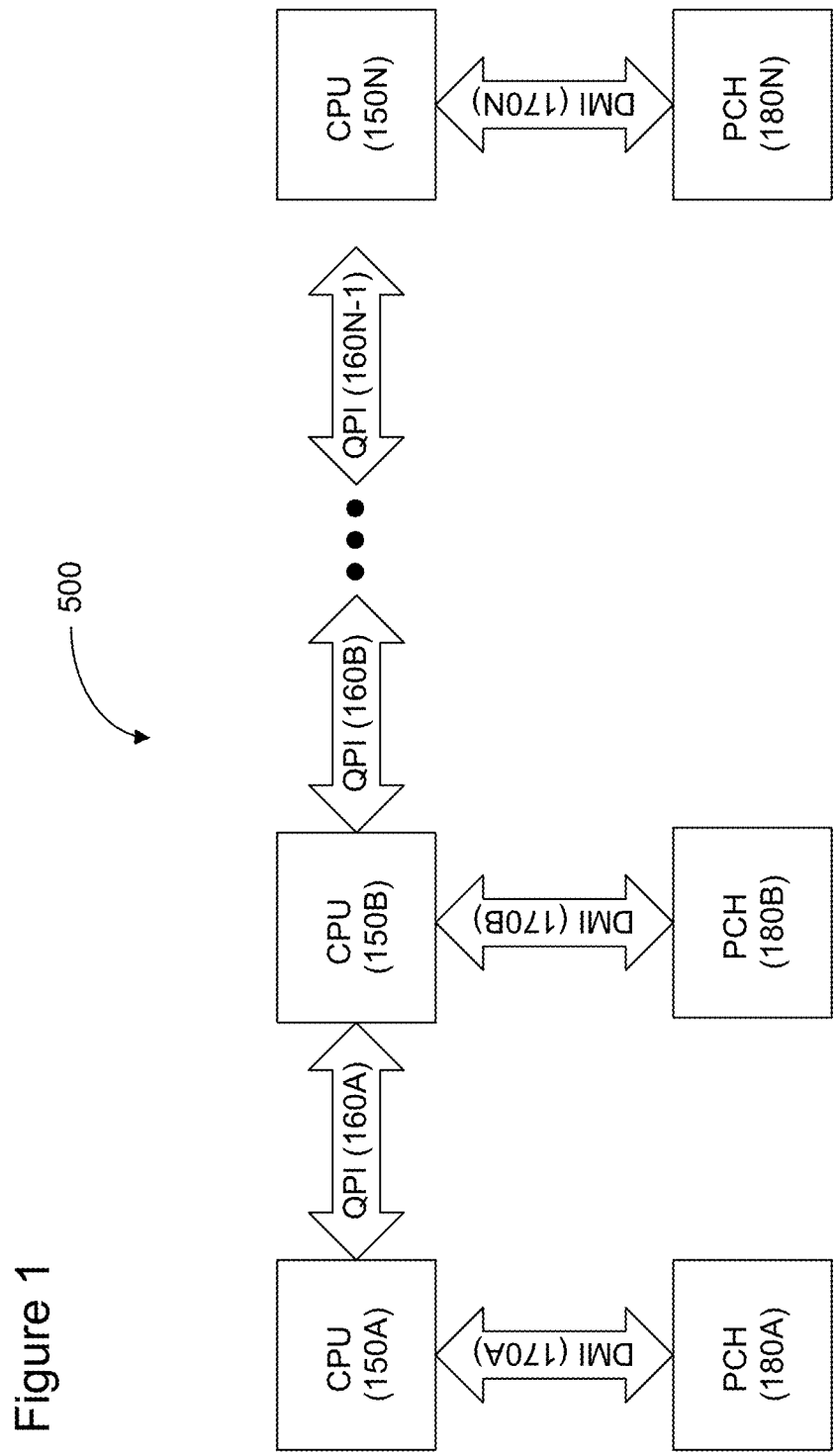
FIG. 1 is a simplified block diagram of a multiprocessor system, according to some embodiments.

In some embodiments, the optimization method 100 solves the issues described in the background section for systems such as the multiprocessor system 500 of FIG. 1, by using the virtual message channels 70 rather than blocking use of the message channel 50. Although the optimization method 100 addresses a problem found in multiprocessor systems, the method may also be used in single-processor systems.

Users, denoted as user 1 30A, user 2 30B, . . . , user K 30K (collectively, "users 30"), represent portions of the pcode flow throughout the multiprocessor system. Tools 80, consisting of application programming interface (API) and helper functions, are available to both the message channel driver 50 and to the users 30.

In some embodiments, the method 100 assigns a virtual channel identifier (VOID) 60 to each user (pcode flow) 30 that uses the message channel 20. Virtual channel identifiers 60A, 60B, . . . , 60K (collectively, "VCIDs 60") are available to each user 30A, 30B, . . . , 30K, respectively. Each pcode flow 30 with a VOID 60 is also capable of registering a callback address. Callback addresses 40A, 40B, . . . , 40K are featured in FIG. 2 for users 1, 2, . . . , K, respectively (collectively, "callback addresses 40"). The callback address 40 for each user 30 enables the message channel driver 50 to return to the pcode flow at the appropriate address, following processing of the message channel transaction for that user. Each user 30 with a VOID 60 can submit one message-channel transaction for processing.

In some embodiments, each user 30A, 30B, . . . , 30K includes a respective buffer 90A, 90B, . . . , 90K (collectively, "buffers 90"). The buffers 90 are temporary storage for message channel data that is to be returned following a message transaction. In some embodiments, the message channel driver 50 retrieves the returned data to the respective buffer 90 when processing message channel transactions.

Further, in some embodiments, the message channel driver 50 includes a queue 110 to keep track of transactions that are waiting to be processed. When processing a succeeding transaction, the message channel driver will retrieve the transaction from the queue 110. In some embodiments, the queue 110 is a first-in-first-out queue.

The users 30 of FIG. 2 are presumed to be those pcode flows in which message channel transactions are to take place. Other pcode flows may not engage in message channel transactions. Such pcode flows are thus not assigned a VOID 60, in some embodiments. Nevertheless, as is shown below, in some embodiments, pcode flows for both message channel transactions and non-message channel transaction benefit from the optimization method 100 described herein.

In some embodiments, the message channel transaction is processed, either immediately or at some future time, by the message channel driver 50. The message channel driver 50 registers an event that causes a kernel within the processor-based system to run a callback function when the message channel transaction has completed. The user (pcode flow) 30 that submitted the transaction becomes notified of the completion when its callback function runs, enabling the user to take any further desired actions subsequent to the completion.

Figure 3:
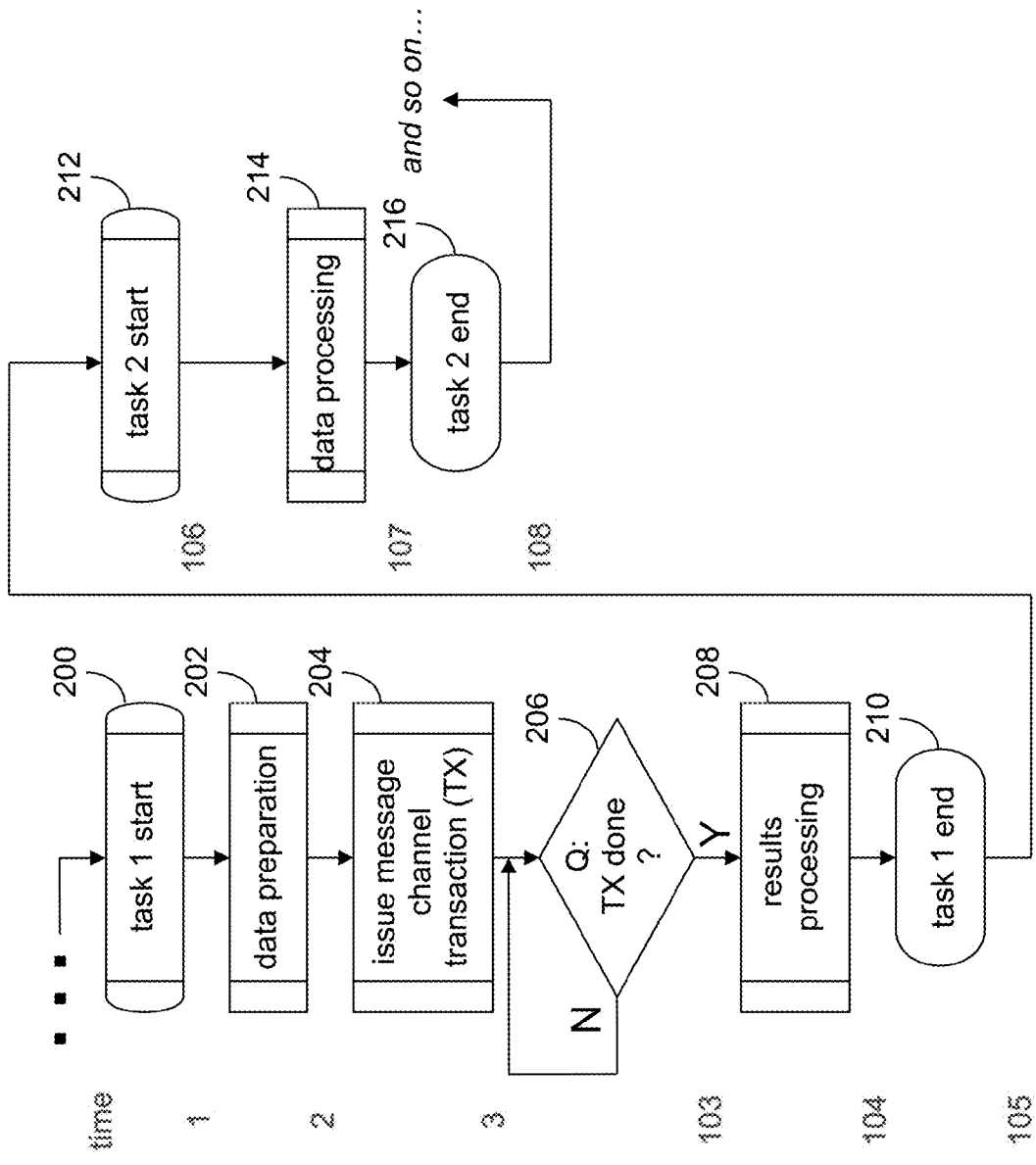
FIG. 3 is a flow diagram showing task flow for two tasks, according to some embodiments.

FIG. 3 is a flow diagram illustrating a method 200 in which two tasks are sequentially processed by the message channel 20, according to some embodiments. The operations 200 of FIG. 3 are performed either in a single processor-based system or in a multiprocessor system, such as the system 500 of FIG. 1. The method 200 features multiple steps being performed in time periods denoted to the left of each step. Two tasks, task 1 and task 2, are to be performed. The tasks are part of the pcode flow 30 referred to earlier, with the pcode flow issuing a message channel transaction in a single processor-based system or in the multiprocessor system 500. Task 1 involves a message channel transaction while task 2 does not.

For those tasks involving message channel transactions, the task is divided into 1) preparation of data, 2) a transaction on the message channel, 3) processing of the results of the message channel, and 4) other data processing that may not be message channel related.

At a first time period, (time period 1), task 1, a first pcode flow (user) 30, begins (block 200). Following data preparation (block 202) at time period 2, the pcode flow 30 issues a message channel transaction at time period 3 (block 204), thus invoking the message channel 20. The first pcode flow 30 waits for the transaction to complete (block 206), with no further processing taking place. In this example, there is a timeout period of 100 time units, and the pcode flow 30 is blocked during that entire period, known as a blocking transaction. At time period 103, the results of the message transaction are processed (block 208), and task 1 is completed (block 210).

The pcode flow 30 further includes a second task, task 2. Task 2 commences at time period 106 (block 212). Data processing takes place at time period 107 (block 214), and task 2 is completed by time period 108 (block 216), with additional tasks to be performed following the completion of task 2.

Figure 4:
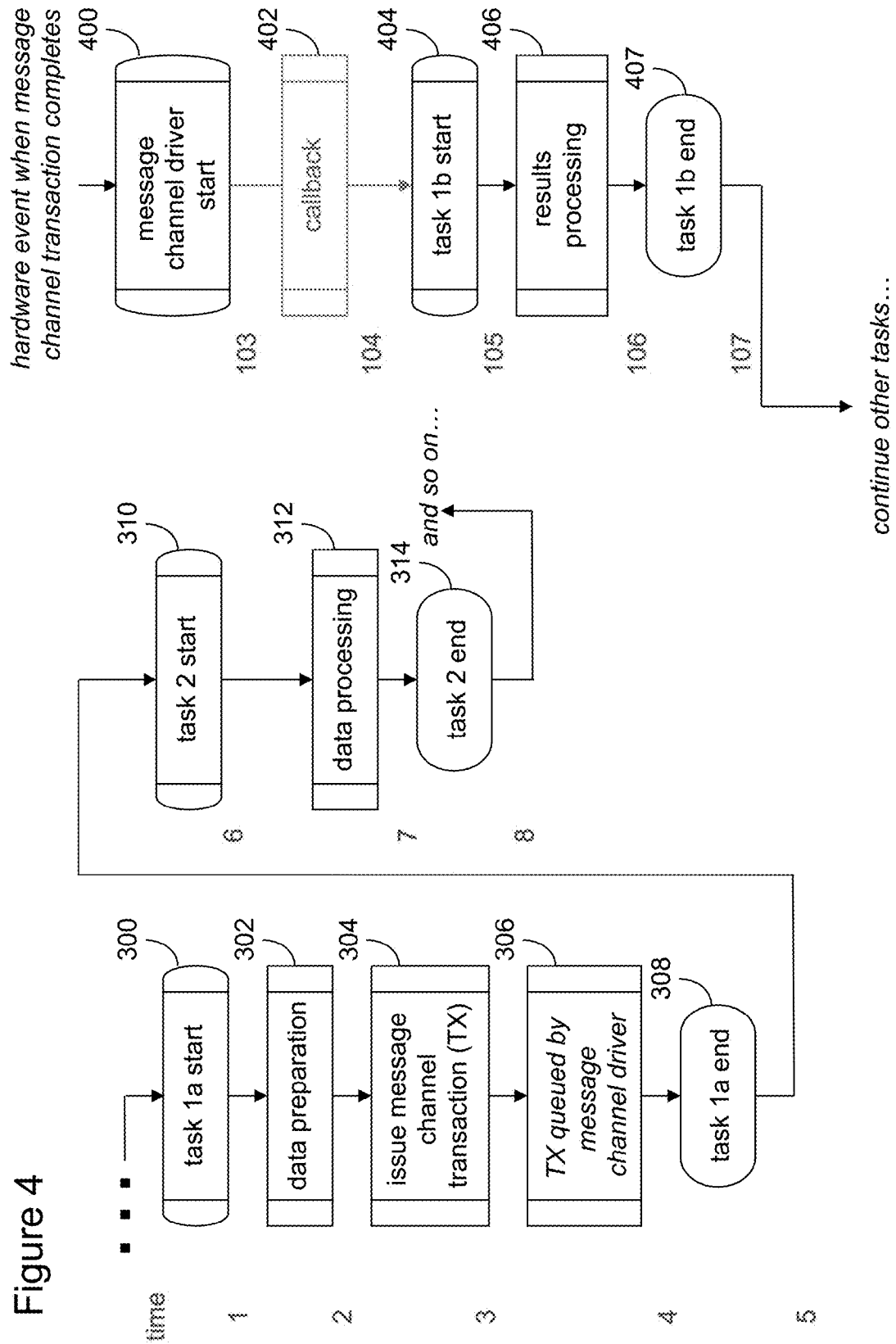
FIG. 4 is a flow diagram showing task flow for the same two tasks as in FIG. 3, this time using the method and system of FIG. 2, according to some embodiments.

FIG. 4, by contrast, features the same two tasks being sequentially performed on either a single processor-based system or on a multiprocessor system such as the system 500 of FIG. 1, this time using the message channel optimization method 100 of FIG. 2, according to some embodiments. The first task, task 1, however, is separated into two parts, task 1a and task 1b, which are processed separately.

Initially, the first part of the first task, task 1a, is processed in a manner similar to how task 1 was processed in FIG. 3. At a first time period, (time period 1), task 1, a first pcode flow 30 begins (block 300). Following data preparation at time period 2 (block 302), the pcode flow 30 issues a message channel transaction at time period 3 (block 304), thus invoking the message channel 20. In this example, rather than having the first pcode flow 30 wait for the transaction to complete (as in block 206 of FIG. 3), the message channel transaction is queued by the message channel driver 50 in time period 4 (block 306). Task 1a, the first part of task 1, is completed at time period 5 (block 308).

As with the method 200 (FIG. 3), in the method 300 (FIG. 4), the pcode flow 30 further includes the second task, task 2. Task 2 commences at time period 6 (block 310). Data processing takes place at time period 7 (block 312), and task 2 is completed by time period 8 (block 314), with additional tasks to be performed following the completion of task 2. Note that, in FIG. 3, task 2 completed at time period 108, while, in the current example, task 2 completed one hundred time units sooner, at time period 8.

Returning to the processing of the first task, when the message channel transaction is issued (block 304), the transaction is being processed, just as in FIG. 3. And, just as in the FIG. 3, the transaction uses 100 time periods to be processed. In FIG. 4, the transaction processing has not been disrupted or changed, instead, the transaction is queued by the message channel driver 50, allowing the task 1a processing to complete such that the next task, task 2, may be processed.

Meanwhile, in some embodiments, when the message channel transaction that was initiated during task 1a completes, a hardware event is generated, in time period 103 (block 400). The message channel driver 50 responds to the hardware event by issuing a callback to the address of the second part of task 1, task 1b, in time period 104 (block 402). The callback address 40 for the given pcode flow (user) 30 contains the address. Task 1b commences in time period 105 (block 404). Since the message channel transaction is completed, the results processing is performed, in time period 106 (block 406), and task 1b ends, in time period 107 (block 407).

It is instructive to compare the operations 200 of FIG. 3 with the optimized operations 300, 400 of FIG. 4. In FIG. 3, two pcode flow tasks, task 1 and task 2, are processed in 108 time periods. In FIG. 4, the same two pcode flow tasks, task 1 and task 2, with the first task further being subdivided into tasks 1a and 1b, are processed in 107 time periods, for an improvement of one time period. Furthermore, however, there is a further opportunity for additional tasks to be processed sequentially following the completion of task 2, with 95 time periods being available between time period 8 and time period 103. And, either tasks that issue message channel transactions (such as task 1) or tasks that do not issue message channel transactions (such as task 2) may be processed during these 95 time periods. Thus, the operations 300, 400 of FIG. 4 provide additional opportunities for efficient processing of message channel transactions, without the need to block one or more transactions.

Further, in some embodiments, the processing of the task 2 transactions commences much earlier with the method 300 than in the method 200. And, by being able to process more tasks sequentially in the 95 additional time periods, the cycles may provide a functional benefit to the system processing the transactions. In some embodiments, the pcode issues hundreds of message channel transactions per millisecond, so the potential benefit of using the cycles may be significant.

Figure 5:
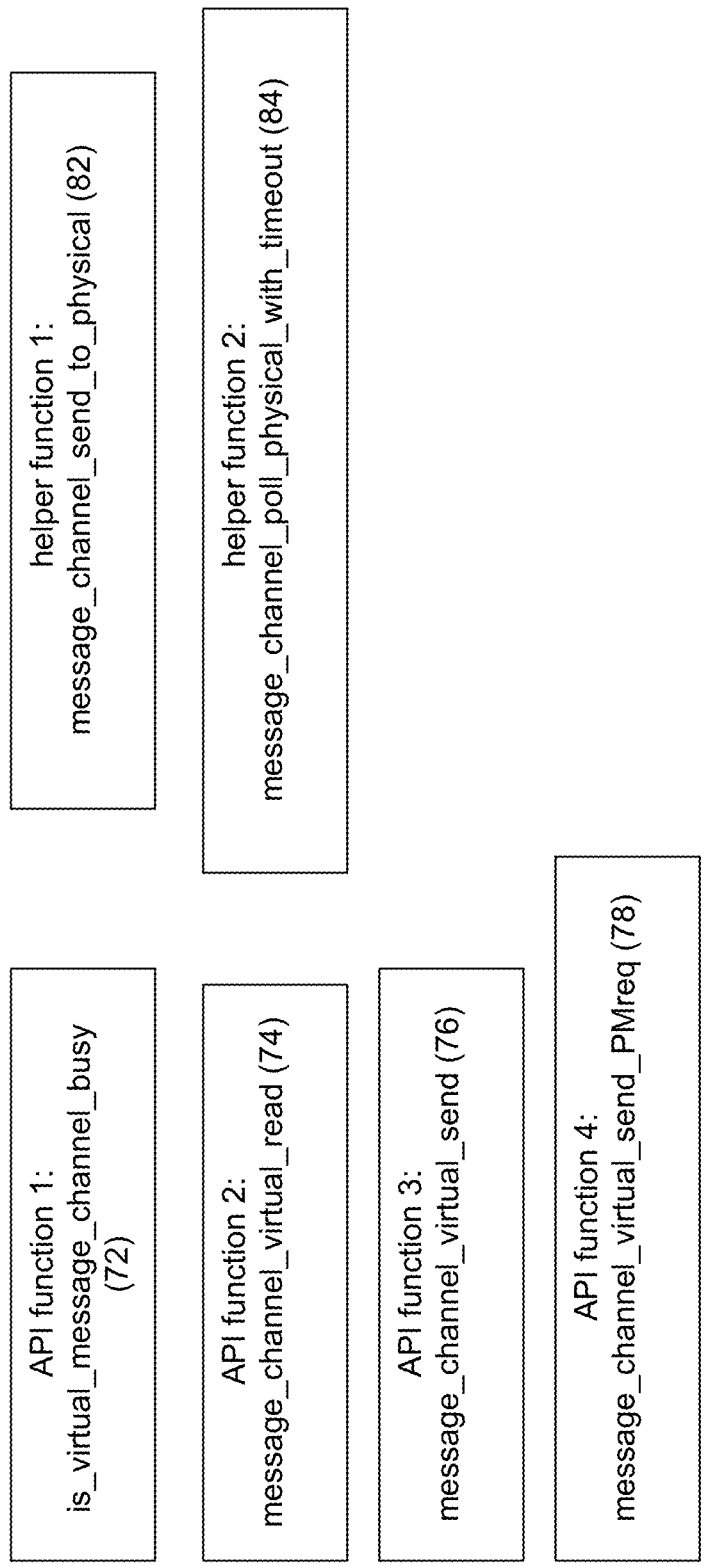
FIG. 5 is a simplified block diagram showing the tools used by the optimization method and system of FIG. 2, according to some embodiments.

Recall that both the message channel driver 50 and the users 30 use tools 80 to assist with performing the optimization method 100. FIG. 5 shows the tools 80 used by the optimization method 100, in some embodiments. There are four functions 72, 74, 76, and 78, which are classified as application programming interface (API) functions and two functions 82 and 84, which are deemed helper functions. Functionally, the user 30 interfaces with the driver 50 (via the API functions 72, 74, 76, 78), and the driver interfaces with the processor. The API functions, therefore, enable the users to access the processor, via the driver 50.

In some embodiments, the first API function 72, is_virtual_message_channel_busy, enables the user 30 to determine whether its virtual channel is busy or idle. The VOID 60 for the user 30 is provided as an input to this function 72. Recall that, based on the VOID 60, the virtual channel 70 is assigned to the user 30. If the user 30 senses a request on its virtual channel 70, another request cannot be sent until the first message has been processed. Thus, before proceeding with the second message, the user 30 ascertains, using the API function 72, whether its virtual message channel 70 is not busy. Further, if the message channel request is one that returns data, the user 30 uses the API function 72 to determine whether the request has been completed, thus enabling the user to retrieve the returned data. The API function 72 is thus essentially a handshaking mechanism between the user 30 and the message channel driver 50. The API function 72 returns a run/busy bit for the virtual message channel 70 specified by the VOID 60 for the user 30.

In some embodiments, the second API function 74, message_channel_virtual_read, returns the contents of the virtual message channel 70 specified by the input, VOID 60. In some embodiments, a 64-bit message channel payload result is returned by the API function 74. The message channel driver 50 returns the read information to the buffer 90 associated with the user 30. Thus, upon invoking this read function 74, the user 30 will read the contents of the buffer 90.

In some embodiments, the third API function 76, message_channel_virtual_send, is the means by which the user 30 sends a message on the message channel 20, using its virtual message channel 70. Recall that the message channel 20 is used by many disparate pcode flows and functions between endpoints in the processor, such as to read and write uncore control registers, issue power management requests (PMReqs), as well as to send messages to other platform entities (e.g., other CPUs 150, PCHs 180 in the multiprocessor system 500). Again, the VOID 60 for the user 30 is provided as an input to this function 76. Once the message is on the virtual message channel 70, the message channel driver 50 is able to process the message on the message channel 30.

In some embodiments, the fourth API function 78, message_channel_virtual_send_PMreq, is a special version of the third API function 76, which processes a PMreq transmission. As with the other API functions, the VOID 60 for the user 30 is provided as an input to this function 78.

PMreq, short for power management request, is a special type of transaction used by the QPI bus that interconnects between CPUs (FIG. 1).

While both the users 30 and the message channel driver 50 use the above API functions, only the driver 50 uses the helper functions 82 and 84, in some embodiments. The helper functions allow *facile* movement of data between the virtual channels 70 and the physical message channel 20. The first helper function, message_channel_send_to_physical 82, enables the message channel driver 50 to send data to the physical message channel 20. The second helper function, message_channel_poll_physical_with_timeout 84, enables the message channel driver 50 to poll the physical message channel for completion of an operation, and includes a timeout.

In some embodiments, the message channel driver 50 registers an event that causes a kernel within the single processor-based system or the multiprocessor system to run a callback function when the message channel transaction has completed. The event is a hardware event, such as an interrupt, that indicates that the message channel 20 is no longer busy, which means that the last thing the driver put in the message channel has completed.

In some embodiments, on behalf of a user (pcode flow) 30, the message channel driver 50 puts a message from the assigned virtual channels 70 of the user into the message channel 20. The message channel driver 50 understands whether the message is to return data or not. Where data is to be returned, the message channel driver 50 retrieves the data and puts it in the buffer 90 dedicated to the user 30. Subsequent to the retrieval by the driver 50, the user 30 employs API read function 74 to retrieve the contents of the buffer 90.

Once the processing of a message channel transaction on behalf of one user is completed, the message channel driver 50 may proceed to "connect" another virtual channel 70 to the message channel 20 on behalf of another user 30.

Figure 6:
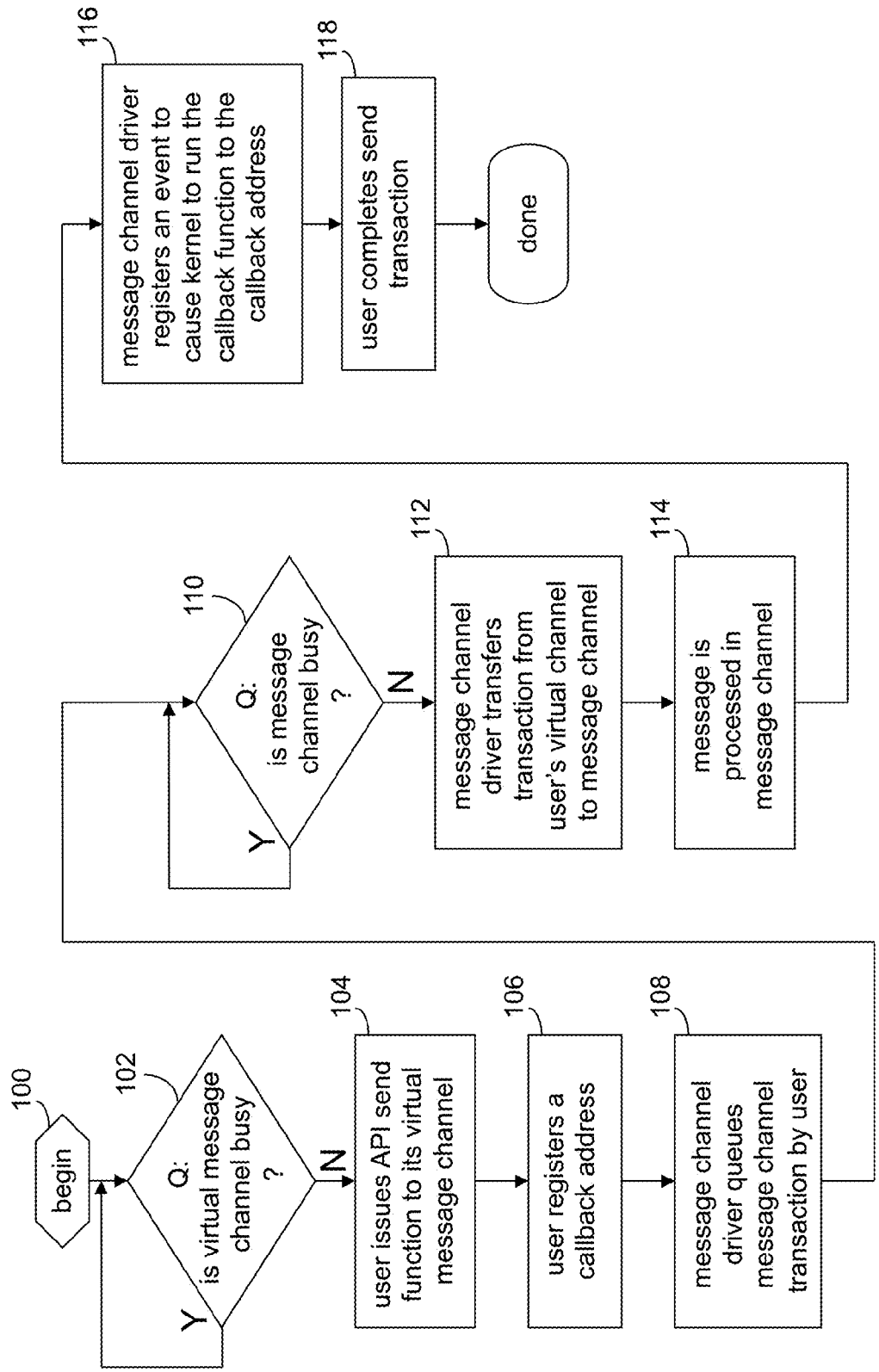
FIG. 6 is a flow diagram following a message channel send operation as processed by the message channel optimization method and system of FIG. 2, according to some embodiments.
Figure 7:
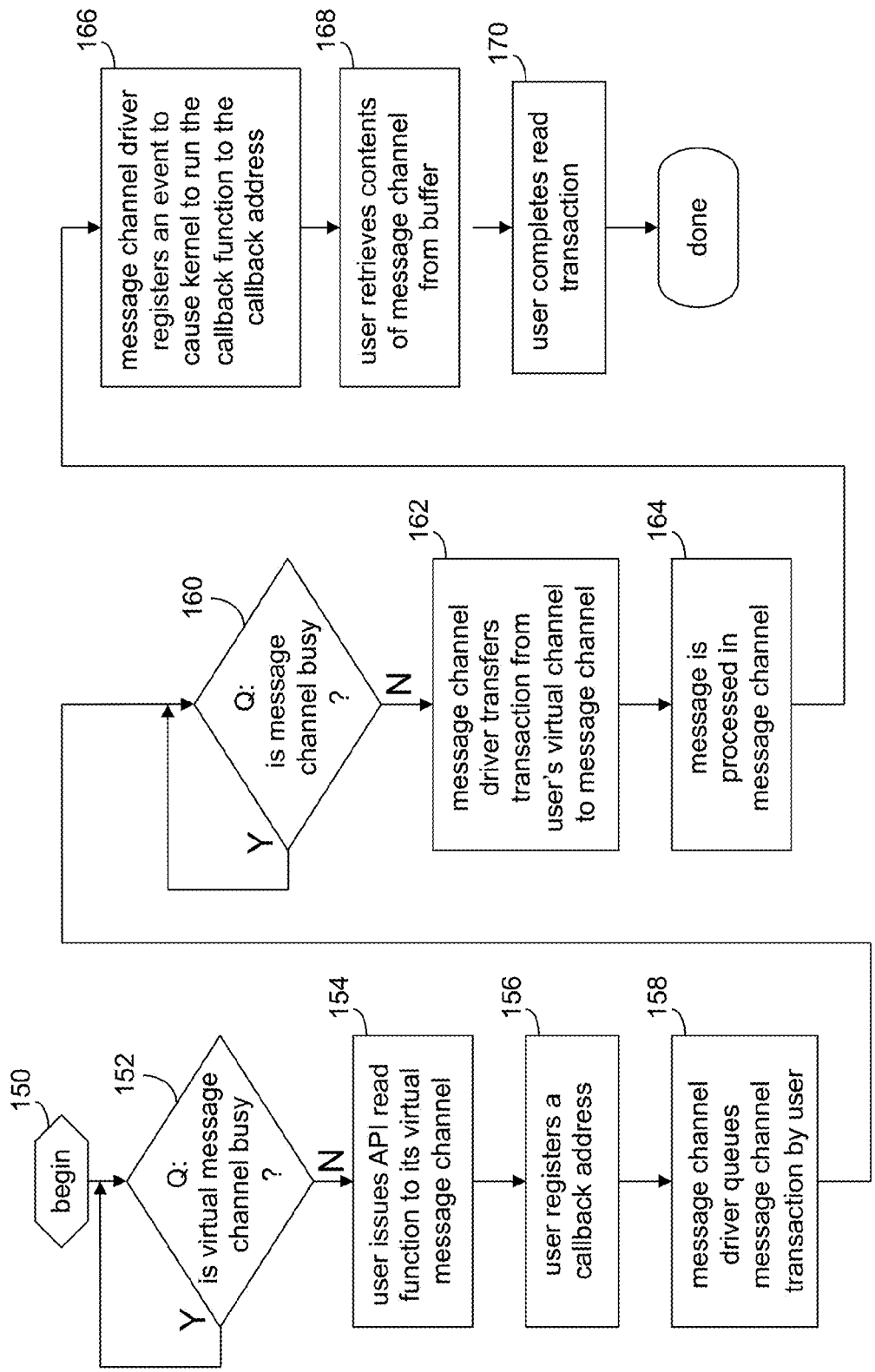
FIG. 7 is a flow diagram following a message channel read operation as processed by the message channel optimization method and system of FIG. 2, according to some embodiments.

FIGS. 6 and 7 are flow diagrams showing operations of the message channel optimization method 100 in processing a send operation and a read operation, respectively, according to some embodiments. FIG. 6 illustrates a send operation by one of the users 30 of either a single processor-based system or a multiprocessor system, such as the multiprocessor system 500 of FIG. 1, while FIG. 7 illustrates a read operation.

First, FIG. 6 describes the send operation. Before the user 30 can issue any transaction on the message channel 20, the user-assigned virtual message channel 70 must be available, in some embodiments. Thus, the user issues the first API function 72 to determine whether the virtual message channel 70 is available (block 102). Once available, the user 30 issues an API send function, either the general API send function 76 or the specialized API send PMreq function 78 (block 104). The user 30 also registers a callback address (block 106) that the message channel driver 50 will use to return to a predetermined address of the user (block 106). At this point, the message channel (send) transaction is queued by the message channel driver 50 (block 108). This frees up the user 30 to continue with other transaction processing.

When the send transaction is issued by the user 30, the message channel 20 may not be available. The pcode of a typical multiprocessor system uses the message channel quite frequently, from hundreds to thousands of times per millisecond. Thus, until the message channel 20 is not busy, the send transaction is not processed (block 110). Once the message channel 20 is available, a hardware event, such as an interrupt, will notify the message channel driver 50 that the message channel is available.

The message channel driver 50, however, is processing virtual message channel transactions for a number of different users. Once the message channel 20 is available and once the user is at the top of the message channel driver's queue 110, the message channel driver 50 sends the message channel transaction from the user's virtual channel 70 to the message channel 20 (block 112). Once at the message channel 20, the message channel transaction is processed (block 114). The message channel driver 50 then registers an event. This event causes the kernel of the single processor-based system or multiprocessor system to run the callback function to the callback address 40 of the user 30 (block 116). The user 30 is thus able to complete the send transaction (block 118).

FIG. 7 shows similar operations, this time where the user 30 is transmitting a read operation to the message channel 20. Again, the user 30 first ensures that the virtual channel 70 is available (block 152). Once available, the user 30 issues the API read function 74 to its virtual message channel 70 (block 154). The user also registers its callback address (block 156) so that the message channel driver 50 will be able to get back to the user pcode flow 30 once the message channel transaction is complete. The message channel driver 50 queues the transaction (block 158).

Once the message channel 20 is available (block 160) and once the user is at the top of the message channel driver's queue 110, the message channel driver 50 sends the message channel transaction from the user's virtual channel 70 to the message channel 20 (block 162). Once at the message channel 20, the message channel transaction is processed (block 164). The message channel driver 50 then registers an event. This causes the kernel of the single processor-based system or multiprocessor system to run the callback function to the callback address 40 of the user 30 (block 166). Since the transaction is a read transaction, the message channel driver 50 put the contents of the read in the buffer 90 of the user 30. The user 30 thus retrieves the contents of the buffer 90 (block 168) and completes the read transaction (block 170).

The message channel optimization method and system 100 thus enable multi-flow access to the message channel infrastructure within a CPU of a single processor-based system or multiprocessor system. The user employs a virtual channel to submit message channel transactions, with the message channel driver processing the transaction "behind the scenes". Each transaction will be processed, either immediately or at some future time, by the message channel driver. Tasks involving message channel transactions as well as non-message channel transactions are processed more efficiently, in some embodiments.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A processor-based system comprising:
a central processing unit (CPU), a first endpoint, and a second endpoint;
a message channel to enable communication between the first endpoint and the second endpoint;
a message channel driver to interface between one or more virtual message channels of the first endpoint and the message channel; and a plurality of users, each user to represent a portion of the portable machine code (pcode) flow through the processor-based system, a virtual channel identifier (VCID) to be assigned to each user that uses the message channel, wherein each pcode flow with a VCID is capable of registering a callback address;
wherein each user with a VCID can submit one message channel transaction for processing;
wherein a user of the plurality of users:
   issues a first application programming interface (API) function to determine whether a virtual message channel of the one or more virtual message channels is available, wherein a virtual channel identifier (VCID) associated with the user is provided as input to the first API function;
   issues a second API function in response to the virtual message channel becoming available; and
   registers a callback address to be used by the message channel driver;
wherein the message channel driver registers an event to cause a kernel in the CPU to run a callback function to the callback address.

2. The processor-based system of claim 1, wherein the second API function either returns contents of the virtual message channel specified by the VCID or sends a message on the message channel using the virtual message channel specified by the VCID.

3. The processor-based system of claim 1, further comprising:
   helper functions;
wherein the API functions and helper functions assist with message channel transactions.

4. The processor-based system of claim 3, wherein each user interfaces with the message channel driver via the API functions and the message channel driver interfaces with the CPU.

5. The processor-based system of claim 3, further comprising:
   a third API function to send a power management request message on the message channel using the virtual message channel specified by the VCID;
wherein the API functions are used by both the users and the message channel driver.

6. The processor-based system of claim 3, the helper functions further comprising:
   a first helper function to enable the message channel driver to send data to the message channel; and
   a second helper function to enable the message channel driver to poll the physical message channel for completion of an operation;
wherein the first and second helper functions are used by the message channel driver and not by the user.

7. The processor-based system of claim 1, further comprising:
   a queue available to the message channel driver, the queue to store transactions that are waiting to be processed.

8. The processor-based system of claim 7, wherein the queue is a first-in-first-out queue.

9. The processor-based system of claim 1, the message channel driver to:
   execute a data preparation portion of a first task, the first task comprising the data preparation, issuance of a message channel transaction, and results processing;
   send a function to the CPU, wherein the function causes the message channel transaction to be queued by the message channel driver; and
   execute a second task, the second task comprising no message channel transaction, wherein the second task is executed irrespective of whether the message channel transaction of the first task is completed;
wherein the message channel driver, upon receiving a hardware event, transfers the message channel transaction from one of the one or more virtual message channels to the message channel where the message channel transaction is carried by the message channel to the second endpoint.

10. The processor-based system of claim 1, further comprising:
   a second CPU; and
   a quick path interconnect (QPI) bus coupled between the CPU and the second CPU.

* * * * *